United States Patent [19]
Curths

[11] Patent Number: 4,873,823
[45] Date of Patent: Oct. 17, 1989

[54] AIR INJECTION PIPE ASSEMBLY AND METHOD OF MAKING

[75] Inventor: Gary Curths, Grand Rapids, Mich.

[73] Assignee: McInerney Incorporated, Grand Rapids, Mich.

[21] Appl. No.: 332,603

[22] Filed: Apr. 3, 1989

[51] Int. Cl.[4] .............................................. F01N 3/30
[52] U.S. Cl. .................................. 60/293; 29/157 R; 60/305
[58] Field of Search .......................... 60/293, 304, 305; 29/157 R, 516

[56] References Cited

U.S. PATENT DOCUMENTS

| | | | |
|---|---|---|---|
| 2,854,816 | 10/1958 | Bodine | 60/293 |
| 3,401,518 | 9/1968 | McWhirter | 60/305 |
| 3,788,071 | 1/1974 | Brewer | 60/293 |
| 3,948,044 | 4/1976 | Wakita | 60/305 |
| 4,162,613 | 7/1979 | Tamura | 60/293 |
| 4,177,640 | 12/1979 | Kuroda | 60/293 |
| 4,373,329 | 2/1983 | Martini | 60/305 |

*Primary Examiner*—Douglas Hart
*Attorney, Agent, or Firm*—Dykema Gossett

[57] ABSTRACT

An air injection pipe assembly adapted for delivering atmospheric air to the exhaust manifold of vehicle engine comprises a manifold air tube having an inlet and a plurality of spaced outlets. An air inlet valve having an outlet pipe is snugly projected into the manifold air tube and crimped thereto. A plurality of irregularly shaped air injection tubes at their one ends project into the manifold air tube outlets respectively and are brazed thereto and a flair fitting is secured upon the other end of each of the air injection tubes adapted for projection into spaced openings of a vehicle exhaust manifold for securing thereto. The method of making an air injection tube comprises the steps of forming a manifold air tube into U-shape and assembling the outlet of an air valve into one end of the air tube and annularly crimping one end of the manifold tube around the outlet of the air valve. Further steps include forming a plurality of outlets along the length of the air manifold tube and providing a plurality of injection tubes of irregular shape and projecting the one ends of said injection tubes into the respective outlets and brazing the one ends of the injection tubes to the manifold tube. A final step includes assembling a flare fitting upon the other end of each of the injection tubes adapted for projection into spaced apertures along the length of the vehicle exhaust manifold.

9 Claims, 2 Drawing Sheets

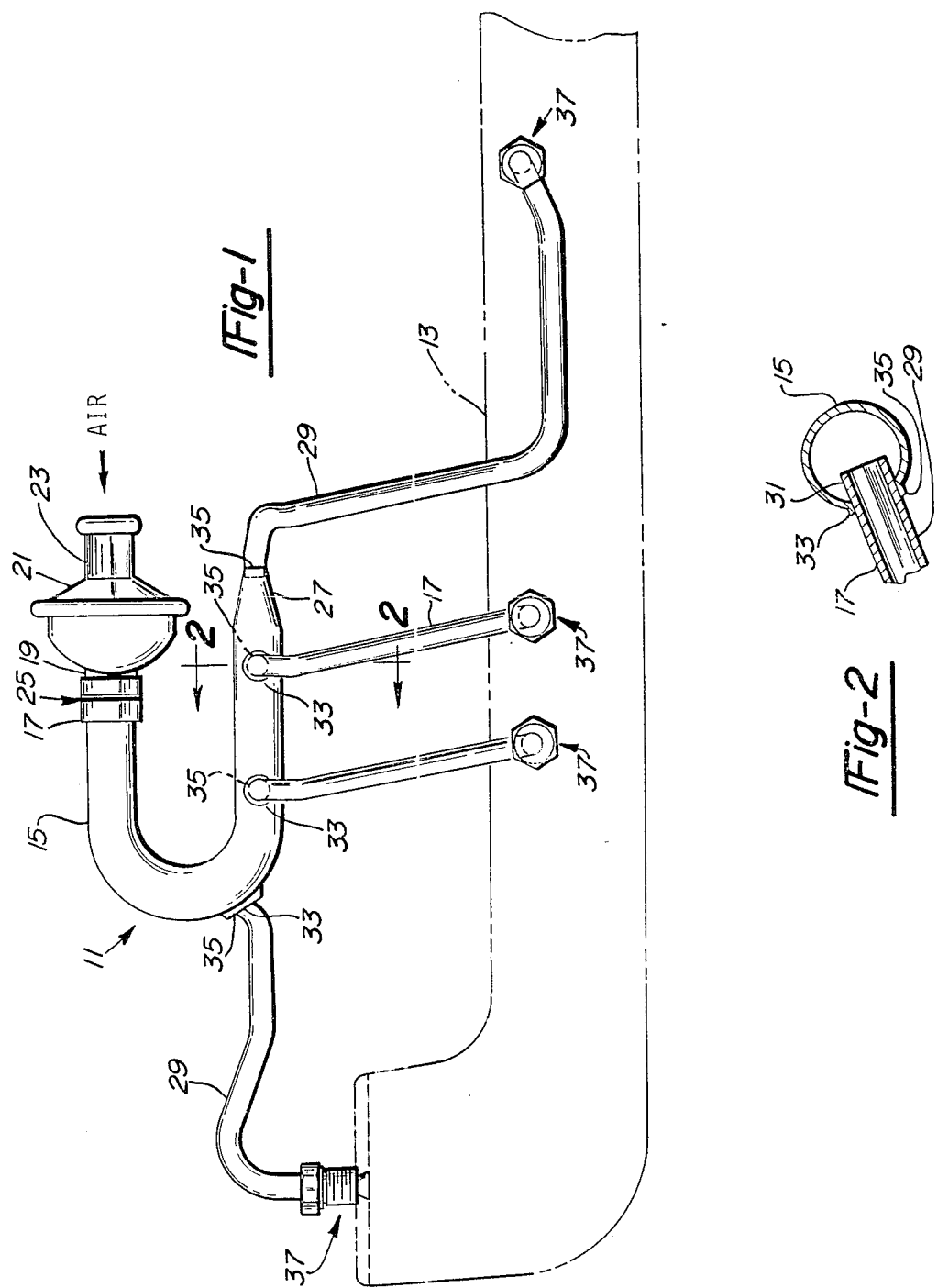

AIR INJECTION PIPE ASSEMBLY AND METHOD OF MAKING

FIELD OF THE INVENTION

The present invention relates to an air injection pipe assembly for delivering atmospheric air to and along the length of an engine exhaust manifold.

BACKGROUND OF THE INVENTION

The assembly of an exhaust system normally includes the engine exhaust manifold and connected thereto a catalytic convertor and successively a muffler and tail pipe. In normal operation and with incomplete combustion there are chemical and other impurities in the exhaust gases passing through the exhaust manifold which are harmful to the catalytic convertors presently in use and which escape therethrough to atmosphere delivering harmful chemicals, gases and vapors thereto. Various efforts have been made to improve the quality of combustion and for cutting down upon contaminents within and passing through the exhaust manifold such by introduction of increased atmospheric air into the intake of the carburetor or the intake manifold of a vehicle in an effort to burn-off more efficiently some of the combustibles and to otherwise oxidize some of the harmful chemicals which may escape combustion in the combustion chamber which may normally pass through the exhaust manifold for application to conventional catalytic convertors.

SUMMARY OF THE INVENTION

An important feature of the present invention is to provide an air injection pipe assembly connected for injecting atmospheric air to and along the length of a vehicle engine exhaust manifold and for additionally removing some of the unburned products of combustion eliminating by filtering out or evaporating harmful chemical products to prevent their entry into the atmosphere.

As another feature, the present air pipe assembly is adapted to provide atmospheric air to and along the length of the exhaust manifold for the further combustion of unburnt combustibles, for raising the temperature of the exhaust gases therein to filter out, burn out, or to vaporize any additional chemicals or other harmful products of combustion before entry of the flow of exhaust gases into the catalytic convertor and to thereby provide a cleaner exhaust with less hydrocarbons and other harmful chemicals reaching the atmosphere.

Another feature is to provide an air manifold tube spaced from and mounted upon an adjacent portion of the vehicle engine and the exhaust manifold thereof to which there is connected at one end an air valve to provide for the introduction of atmospheric air into the manifold air tube. Connected to the manifold air tube at their one ends are a plurality of laterally spaced irregularly shaped air injection tubes in communication with the interior of the manifold air tube. Their other ends are connected to the exhaust manifold to deliver atmospheric air to spaced portions of the exhaust manifold.

Another feature of the present invention includes an effective method and means for securing the air valve to the inlet end of the air manifold tube by an annular crimp between the outlet of the air valve and the inlet of the air manifold tube such as will substantially permanently anchor the air valve thereon.

The present invention includes the formation upon the manifold air tube of an outlet upon one end thereof and intermediate its ends a plurality of laterally spaced outlets. Into the outlets there is projected the one ends of the respective air injection tubes which extend into the interior of the air manifold tube and are brazed thereto respectively. The other ends of the air injection tubes are connected and sealed to longitudinally spaced portions of the exhaust manifold.

As another feature of the present invention there is provided upon the outlet ends of the respective air injection tubes a flare fitting which is adapted for sealing and anchorage to corresponding openings formed within the exhaust manifold and fixedly secured thereto. Atmospheric air delivered to the manifold air tube through the air valve is injected through the air injection tubes to longitudinally spaced portions of the exhaust manifold tube along its length for modifying and improving the products of combustion passing through the exhaust manifold and into the catalytic convertor and for the elimination of some harmful chemicals.

As another feature of the present invention, there is provided an improved method of making an air injection tube which comprises the steps of forming a manifold air tube into U-shape and assembling the outlet of an air valve into one end of the air tube and annularly crimping and securing it to the inlet end of the air manifold tube. Further steps include forming a series of outlets at the end of the air manifold tube and intermediate its ends and providing a plurality of air injection tubes of irregular shape and uniform diameter and projecting the one ends of each air injection tube into one of the outlets of the air manifold tube and brazing it thereto. A further step includes assembling upon the other ends of the respective air injection tubes a plurality of flare fittings of conventional construction which are adapted to retainingly project into spaced apertures formed within a vehicle exhaust manifold and securing thereto and by which atmospheric air is delivered to the interior of the exhaust manifold along its length for modifying and improving the quality of the products of combustion passing outwardly therefrom.

These and other features and objects will be seen from the following specification and claims in conjunction with the appended drawing.

THE DRAWING

FIG. 1 is a plan view of the present air injection pipe assembly with connected air valve and a series of air injection tubes extending therefrom and connected to a vehicle exhaust manifold, fragmentarily shown.

FIG. 2 is a fragmentary section taken in the direction of arrows 2—2 of FIG. 1, and upon an increased scale.

Figure 3:
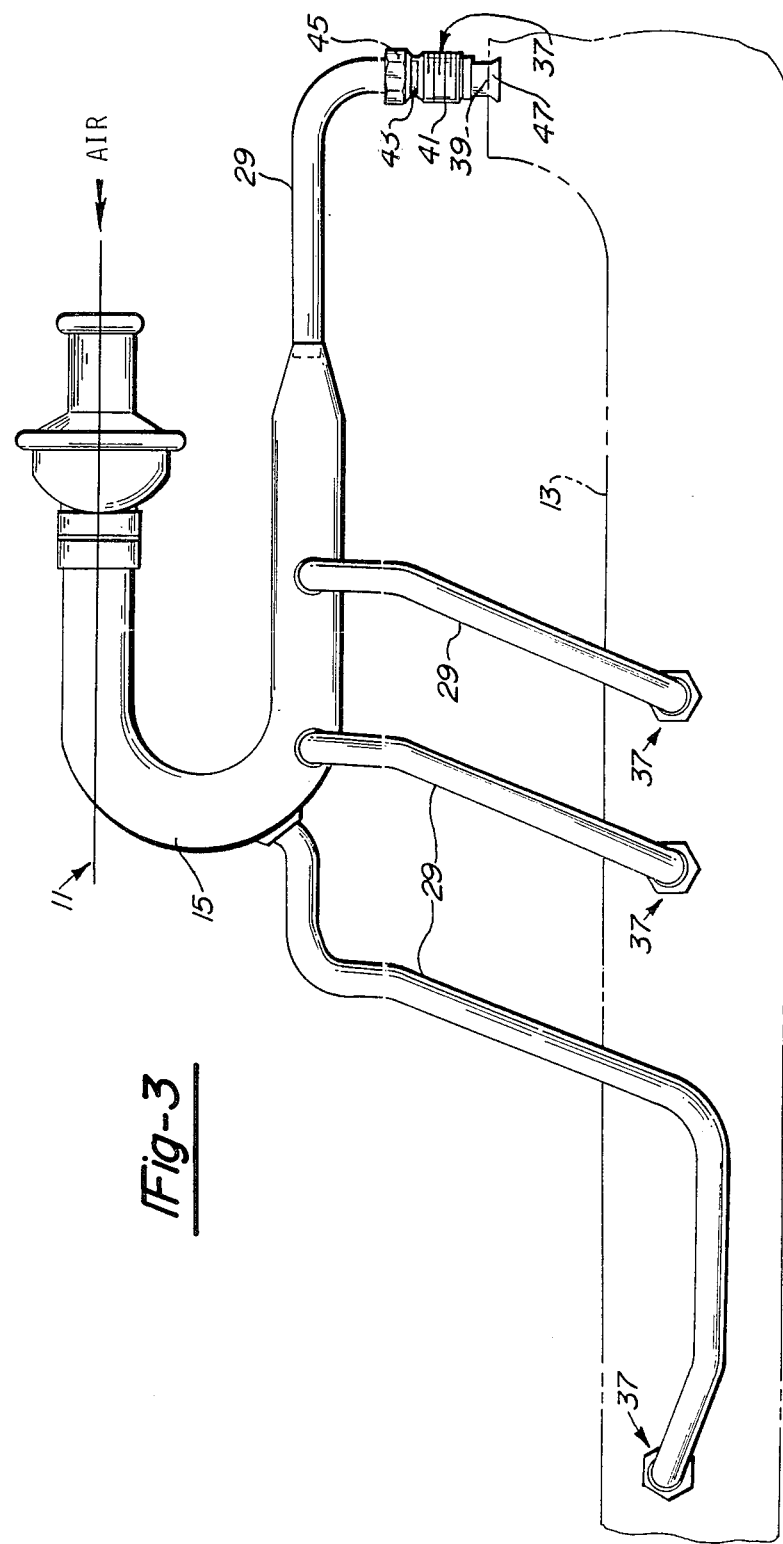
FIG. 3 is a fragmentary side elevational view of the assembly shown in FIG. 1.

It will be understood that the above drawing illustrates merely a preferred embodiment of the invention and the respective steps of the present method, and other embodiments and steps are contemplated within the scope of the claims hereafter set forth.

DETAILED DESCRIPTION OF AN EMBODIMENT OF THE INVENTION

Referring to the drawing FIGS. 1, 2 and 3, the present air injection pipe assembly is generally indicated at 11, adapted for connection to the exhaust manifold 13 of a vehicle engine is usually of irregular shape and is fragmentarily shown in FIGS. 1 and 3.

The present injection pipe assembly includes a manifold air tube 15 of general U-shape in plan, FIG. 1, which has a slightly enlarged inlet 17 adapted to receive the outlet 19 of the one-way air valve 21 having air inlet 23 as designated by the arrow. Annular crimp 25 is formed over and around the inlet 17 with the air valve outlet 19 concentrically assembled therein. This provides a mechanical interlock and securing between air valve outlet and the inlet 17. This annular crimp is done in accordance with the U.S. Pat. No. 4,528,740 of MSW Corporation, now by change of name the assignee of the present application McInerney, Inc. This is in accordance with the disclosure of patent no. 4,528,740, incorporated hereinto by reference to the extent necessary for an understanding of the assembly and annular crimping and securing and sealing of the air valve onto the inlet 17 of the manifold air tube 15.

In accordance with the disclosure in said patent, there is formed an annular channel and bead between the assembled members 17 and 19 to provide a substantially permanent or semi-permanent interlock between the air valve and the manifold air tube 15 at one end thereof.

The present manifold air tube 15 at one end has a tapered outlet 27.

A plurality of spaced lateral outlets 33 are formed along portions of the length of manifold air tube 15 in the form of circular flanges, FIG. 2.

There are provided a plurality of air injection tubes 29 of irregular shape and different length but substantially uniform diameter. Their one ends are projected into the respective tapered outlet 27 and lateral outlets 33, FIG. 2, and are annularly brazed thereto at 35. As is shown in FIG. 2, the one ends of the respective air injection tubes 29 snugly project through the lateral outlets 33 and into the tapered outlet 27 and are brazed in place for effectively securing and sealing the one ends of the air injection tubes 29 to the manifold air tube 15 along its length.

The term brazing is intended to include various forms of brazing, such as infra-red brazing, torch brazing, furnace brazing, induction brazing, resistance or dip brazing. The respective air injection tubes 29 have some flexibility to assist in their assembly and connection to the exhaust manifold 13, FIGS. 1 and 3.

Upon the other ends of each of the respective air injection tubes 29 there is provided a flare fitting 37 adapted for connection into spaced apertures 39 along the length of the exhaust manifold 13, fragmentarily shown in the drawing.

The flare fitting is substantially conventional in assembly, and includes a flared end 47 which is forced projected into one of the corresponding undersized apertures 39 within portions of the exhaust manifold 13. Said other end of each air injection tube 29 includes a threaded portion 43 and loosely assembly over an end portion of the air injection tube is a sleeve 41 adapted to operatively engage an exterior portion of the exhaust manifold 13.

Securing bolts 45 are threaded over the threaded ends 43 forming a part of the flare connection so that upon force projection of the flare portion 47 into the respective openings 39 and then theading down the respective fasteners 45 there is a tight and snug assembly and connection of the outer ends of the respective air injection tubes 29 onto the respective apertured portions of exhaust manifold 13. The air injection tubes 29 being flexible, assists in the assembly of their respective down turned end portions and securement of the respective flare fittings onto portions of exhaust manifold 13.

In operation of the present injection air pipe assembly, atmospheric air enters through the one-way air valve 23 and into the inlet end 17 of the manifold air tube 15. Air passes through the respective outlets 27 and 33 extends through the respective air injection tubes 29 and through the connections of the flare fittings 37 for delivering atmospheric air to longitudinally spaced portions upon the interior of the exhaust manifold.

This has the advantage of providing additional combustion air to the interior of the exhaust manifold to assist in the oxidation of some of the products of combustion which otherwise weren't burned in the combustion chamber. It also provides an elevation of the temperature of the exhaust gases within the exhaust manifold such as will assist in the oxidation of some of the harmful products of combustion including chemicals and hydrocarbons for preventing their entry into the catalytic convertor and enter into the atmosphere in an effort to reduce such emission products to a minimum.

By increasing the atmospheric air supplied to the exhaust manifold it is believed that there is an increase in the temperature of the products of combustion causing oxidation or burning up of considerable of the harmful products of combustion including gases or contaminants would otherwise pass through the catalytic convertor, the exhaust pipe and muffler to atmosphere.

The present invention further includes a method of assembly of the present air injection pipe assembly which includes the following steps:

(1) forming a manifold outlet tube 15 into generally U-shape;
(2) assembling the outlet 19 of the air valve 21 into one end 17 of the manifold air tube;
(3) annularly crimping inlet 17 over the assembled outlet 19 of the air valve securing the air valve thereto;
(4) forming an outlet 27 at the other end of the manifold air tube 15 and additionally forming plurality of spaced lateral outlets 33 in the manifold tube 15 intermediate its ends;
(5) providing a plurality of air injection tubes 29 of irregular shape and substantially uniform diameter, and slightly flexible;
(6) projecting the one ends of the air injection tubes into the outlets 27 and 33 of the manifold air tube 15;
(7) brazing at 35 said one ends of the air injection tubes to the manifold air tube; and
(8) assembling a flare fitting 37 upon the other end of each of the respective air injection tubes, adapted for snug projection into spaced apertures 39 along the length of the exhaust manifold 13.

Having described my invention, reference should now be had to the following claims.

I claim:

1. An air injection pipe assembly adapted for delivering atmospheric air to and along the length of the exhaust manifold of a vehicle engine comprising:
a manifold air tube spaced from said exhaust manifold, having an inlet at one end and an outlet at its other end;
a plurality of spaced lateral outlets along the length of said manifold air tube intermediate its ends;

an air inlet valve having an outlet pipe snugly projected into the inlet of said manifold air tube;

means securing said air valve outlet to said manifold air tube inlet;

a plurality of irregularly shaped air injection tubes, at their one ends projected into said manifold air tube lateral outlets and into the manifold air tube outlet respectively;

an annular braze securing and sealing said one ends respectively of said air injection tubes to said manifold air tube; and a flare fitting upon the other end of the air injection tubes adapted for projection into spaced openings in said exhaust manifold and secured and sealed to said exhaust manifold.

2. In the air injection pipe assembly of claim 1, further comprising:

an exhaust manifold having a plurality of openings along its length receiving said flare fittings respectively.

3. In the air injection pipe assembly of claim 1, said means securing said air valve outlet to said manifold air pipe inlet including an annular crimp around the assembled air valve outlet and manifold air tube inlet, extending through 360 degrees substantially.

4. In the air injection pipe assembly of claim 1, further comprising:

said braze being selected from the group including infra-red, torch, furnace, induction, resistance and dip-brazing.

5. In the air injection pipe assembly of claim 1, further comprising:

said manifold air tube being substantially U-shaped in plan.

6. In the air injection pipe assembly of claim 1, the outlet of said manifold air tube being tapered.

7. In the air injection pipe assembly of claim 1, further comprising:

said lateral outlets of said manifold air tube being in the form of annular flanges, with the one ends of said air injection tubes snugly projected through said flanges and into said manifold air tube.

8. In the air injection pipe assembly of claim 1, further comprising:

each flare fitting including a threaded portion spaced from said other end of each air injection tube;

each tube terminating in an outward taper to retainingly engage the interior of the exhaust manifold, a sleeve mounted over said other end;

a nut threaded thereon adapted to compressively engage said sleeve.

9. The method of making an air injection tube comprising:

a. forming a manifold air tube into U-shape;

b. assembling the outlet of an air valve into one end of the air tube;

c. annularly crimping said one end of said manifold air tube around said air valve outlet for a secured annular interlock;

d. forming an outlet at the other end of said manifold air tube, and a plurality of spaced lateral outlets in said manifold air tube intermediate its ends;

e. providing a plurality of air injection tubes of irregular shape and uniform diameter;

f. projecting one end of each air injection tube into said outlets respectively;

g. brazing said one ends of said air injection tubes to said manifold air tube; and h. assembling a flare fitting upon the other end of each air injection tube, adapted for projection into spaced apertures along the length of a vehicle exhaust manifold.

* * * * *